(12) United States Patent
Osawa et al.

(10) Patent No.: US 11,543,818 B2
(45) Date of Patent: Jan. 3, 2023

(54) CARGO TRANSPORT SYSTEM AND AUTOMATED GUIDED VEHICLE

(71) Applicant: SHARP KABUSHIKI KAISHA, Sakai (JP)

(72) Inventors: Hiroki Osawa, Sakai (JP); Masahiro Sakakibara, Sakai (JP); Takahiro Ueno, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 726 days.

(21) Appl. No.: 16/471,206

(22) PCT Filed: Nov. 17, 2017

(86) PCT No.: PCT/JP2017/041523
§ 371 (c)(1),
(2) Date: Jun. 19, 2019

(87) PCT Pub. No.: WO2018/116718
PCT Pub. Date: Jun. 28, 2018

(65) Prior Publication Data
US 2019/0384280 A1    Dec. 19, 2019

(30) Foreign Application Priority Data
Dec. 22, 2016  (JP) .............................. JP2016-249661

(51) Int. Cl.
*G05D 1/02*  (2020.01)
*G05D 1/00*  (2006.01)
*B65G 1/137*  (2006.01)

(52) U.S. Cl.
CPC ......... *G05D 1/0027* (2013.01); *B65G 1/1373* (2013.01); *G05D 1/0088* (2013.01); *G05D 1/021* (2013.01)

(58) Field of Classification Search
CPC .... G05D 1/0027; G05D 1/0088; G05D 1/021; B65G 1/1373
See application file for complete search history.

(56) References Cited

U.S. PATENT DOCUMENTS

| | | | |
|---|---|---|---|
| 8,983,647 B1 * | 3/2015 | Dwarakanath | G05B 15/02 700/216 |
| 9,714,139 B1 * | 7/2017 | Aggarwal | B64C 39/024 |

(Continued)

FOREIGN PATENT DOCUMENTS

| | | |
|---|---|---|
| JP | H01-180610 A | 7/1989 |
| JP | 2000-095312 A | 4/2000 |

(Continued)

OTHER PUBLICATIONS

Machine translation of Matsuo et al. JP 2000-95312 A, pp. 3-4, 6 (Year: 2022).*

*Primary Examiner* — Anne Marie Antonucci
*Assistant Examiner* — Jared C Bean
(74) *Attorney, Agent, or Firm* — ScienBiziP, P.C.

(57) ABSTRACT

There is provided a cargo transport system including: a management device; and a plurality of automated guided vehicles. Each of the automated guided vehicles includes: a movement instruction receiving unit that receives, from the management device, a movement instruction for moving to at least one loading operation place where a loading operation of loading a cargo to be transported into the automated guided vehicle is performed or a specified position near the loading operation place; an information transmitting unit that transmits, to the management device, load information concerning a load state of the cargo loaded into the automated guided vehicle; and a traveling unit that performs automated traveling in accordance with the received movement instruction. The management device includes: a movement instruction management unit that transmits the move- (Continued)

ment instruction to each of the automated guided vehicles; a load information receiving unit; and a load amount management unit.

6 Claims, 5 Drawing Sheets

(56) References Cited

U.S. PATENT DOCUMENTS

| | | | | |
|---|---|---|---|---|
| 2010/0299175 A1* | 11/2010 | Marchildon | ....... | G06Q 30/0201 |
| | | | | 705/7.29 |
| 2015/0032252 A1* | 1/2015 | Galluzzo | ............... | B60P 1/5423 |
| | | | | 700/218 |
| 2018/0075402 A1* | 3/2018 | Stadie | .............. | G05B 19/41895 |

FOREIGN PATENT DOCUMENTS

| | | |
|---|---|---|
| JP | 2001-255923 A | 9/2001 |
| JP | 2002-087550 A | 3/2002 |
| JP | 3976620 B2 | 9/2007 |
| JP | 2009-286508 A | 12/2009 |
| JP | 2013-151348 A | 8/2013 |
| WO | 2016/129045 A1 | 8/2016 |

\* cited by examiner

CARGO TRANSPORT SYSTEM AND AUTOMATED GUIDED VEHICLE

TECHNICAL FIELD

The present invention relates to a cargo transport system including a management device and a plurality of automated guided vehicles and to an automated guided vehicle.

BACKGROUND ART

For an assembly line in which a large number of parts are assembled into cars, etc., a system for carrying parts necessary for assembly using automated guided vehicles is known. The parts are stored on parts shelves at positions determined in advance by type, and the quantities and attributes of the parts and the positions of the shelves on which the parts are stored are managed by a management device. An automated guided vehicle moves from a parts shelf to a parts shelf together with a loading operator in accordance with an instruction from the management device and stops at the position of a parts shelf on which parts to be loaded are stored. A picking operator who moves together with an automated guided vehicle repeats an operation (picking) of loading parts stored on a parts shelf into the automated guided vehicle.

For such a system, a system is proposed that focuses on one automated guided vehicle (self-propelled cart) and controls the stop time of the self-propelled cart by taking into consideration a time required for piking and classifying parts of each type (for example, see PTL 1).

CITATION LIST

Patent Literature

PTL 1: Japanese Patent No. 3976620

SUMMARY OF INVENTION

Technical Problem

An amount of cargo (load amount) that can be loaded into one automated guided vehicle is limited. When the amount of loaded cargo reaches a limit (maximum load amount), it is necessary to move the automated guided vehicle to the next place, such as an unloading place, and to call another automated guided vehicle. The time when the amount of loaded cargo reaches the maximum load amount depends on the type of cargo to be loaded, the operation speed of the loading operator, etc., and it is difficult to determine the time in advance.

Therefore, a practical solution is such that, when the loading operator determines that the amount of cargo loaded into the automated guided vehicle for which an operation is currently ongoing reaches the maximum load amount, the loading operator calls the next automated guided vehicle and moves the current automated guided vehicle to an unloading place.

However, in such a case where the next guided vehicle is called after the amount of loaded cargo of the automated guided vehicle reaches the maximum load amount, the operator needs to wait for a period from when the next automated guided vehicle is called and starts moving to when the next automated guided vehicle reaches the operator. From this viewpoint, the solution has low productivity. Therefore, the next automated guided vehicle needs to be called before the amount of loaded cargo reaches the maximum load amount. On the other hand, if the next automated guided vehicle is called too earlier in order to provide a margin, the next automated guided vehicle needs to wait. Further, the automated guided vehicle causes problems, in terms of space, in that the automated guided vehicle blocks an aisle or hinders operations. Further, for example, the system requires automated guided vehicles more than necessary, which produces an adverse effect. As described above, an earlier timing for calling the next automated guided vehicle may reduce productivity. Therefore, it is important to call the next automated guided vehicle at a suitable timing. However, it is difficult for the operator to determine a suitable time and call the next automated guided vehicle, and causing the operator to perform such an operation is troublesome to the operator.

The present invention has been made in view of the above-described circumstances and provides a cargo transport system and an automated guided vehicle with which smooth and efficient replacement of an automated guided vehicle is made possible and productivity of an operator and automated guided vehicles can be increased.

Solution to Problem

The present invention provides a cargo transport system including: a management device; and a plurality of automated guided vehicles. Each of the automated guided vehicles includes: a movement instruction receiving unit that receives, from the management device, a movement instruction for moving to at least one loading operation place where a loading operation of loading a cargo to be transported into the automated guided vehicle is performed or a specified position near the loading operation place; an information transmitting unit that transmits, to the management device, load information concerning a load state of the cargo loaded into the automated guided vehicle; and a traveling unit that performs automated traveling in accordance with the received movement instruction. The management device includes: a movement instruction management unit that transmits the movement instruction to each of the automated guided vehicles; a load information receiving unit that receives the load information from each of the automated guided vehicles; and a load amount management unit that manages a load amount of each of the automated guided vehicles on the basis of the load information. In a case where a load amount of a first automated guided vehicle exceeds a predetermined criterion value while a loading operation is ongoing for the first automated guided vehicle at the loading operation place, the movement instruction management unit transmits, to a second automated guided vehicle different from the first automated guided vehicle, a movement instruction for moving to the loading operation place or the specified position near the loading operation place.

From another aspect, the present invention provides an automated guided vehicle including: a movement instruction receiving unit that receives a movement instruction for moving to at least one loading operation place where a loading operation of loading a cargo to be transported into the automated guided vehicle is performed or a specified position near the loading operation place; a traveling unit that performs automated traveling in accordance with the received movement instruction; and an information transmitting unit that transmits information for moving another automated guided vehicle to the loading operation place or the specified position near the loading operation place in a case where a load amount of the automated guided vehicle exceeds a predetermined criterion value while the loading operation at the loading operation place is ongoing.

The present invention further provides a cargo transport system including: a management device; a plurality of automated guided vehicles; and a console. Each of the automated guided vehicles includes: a movement instruction receiving unit that receives, from the management device, a movement instruction for moving to at least one loading operation place where a loading operation of loading a cargo to be transported into the automated guided vehicle is performed or a specified position near the loading operation place; and a traveling unit that performs automated traveling in accordance with the received movement instruction. The console includes a load information transmitting unit that transmits, to the management device, load information concerning a load state of the cargo loaded into the automated guided vehicle. The management device includes: a movement instruction management unit that transmits the movement instruction to each of the automated guided vehicles; a load information receiving unit that receives the load information from each of the automated guided vehicles; and a load amount management unit that manages a load amount of each of the automated guided vehicles on the basis of the load information. In a case where a load amount of a first automated guided vehicle exceeds a predetermined criterion value while a loading operation is ongoing for the first automated guided vehicle at the loading operation place, the movement instruction management unit transmits, to a second automated guided vehicle different from the first automated guided vehicle, a movement instruction for moving to the loading operation place or the specified position near the loading operation place.

Advantageous Effects of Invention

In the cargo transport system according to the present invention, in a case where the load amount of the first automated guided vehicle exceeds the predetermined criterion value while a loading operation is ongoing for the first automated guided vehicle at the loading operation place, the movement instruction management unit transmits, to the second automated guided vehicle different from the first automated guided vehicle, a movement instruction for moving to the loading operation place or the specified position near the loading operation place. Therefore, smooth and efficient replacement of an automated guided vehicle is made possible, and productivity of an operator and automated guided vehicles can be increased.

The automated guided vehicle according to the present invention also produces similar advantageous effects.

DESCRIPTION OF EMBODIMENTS

Hereinafter, the present invention will be further described in detail with reference to the drawings. Note that the following description is illustrative in all aspects and should not be construed as limiting the present invention.

First Embodiment

<<Overall Configuration of Cargo Transport System>>

The overall configuration of a cargo transport system according to this embodiment will be described.

Figure 1:
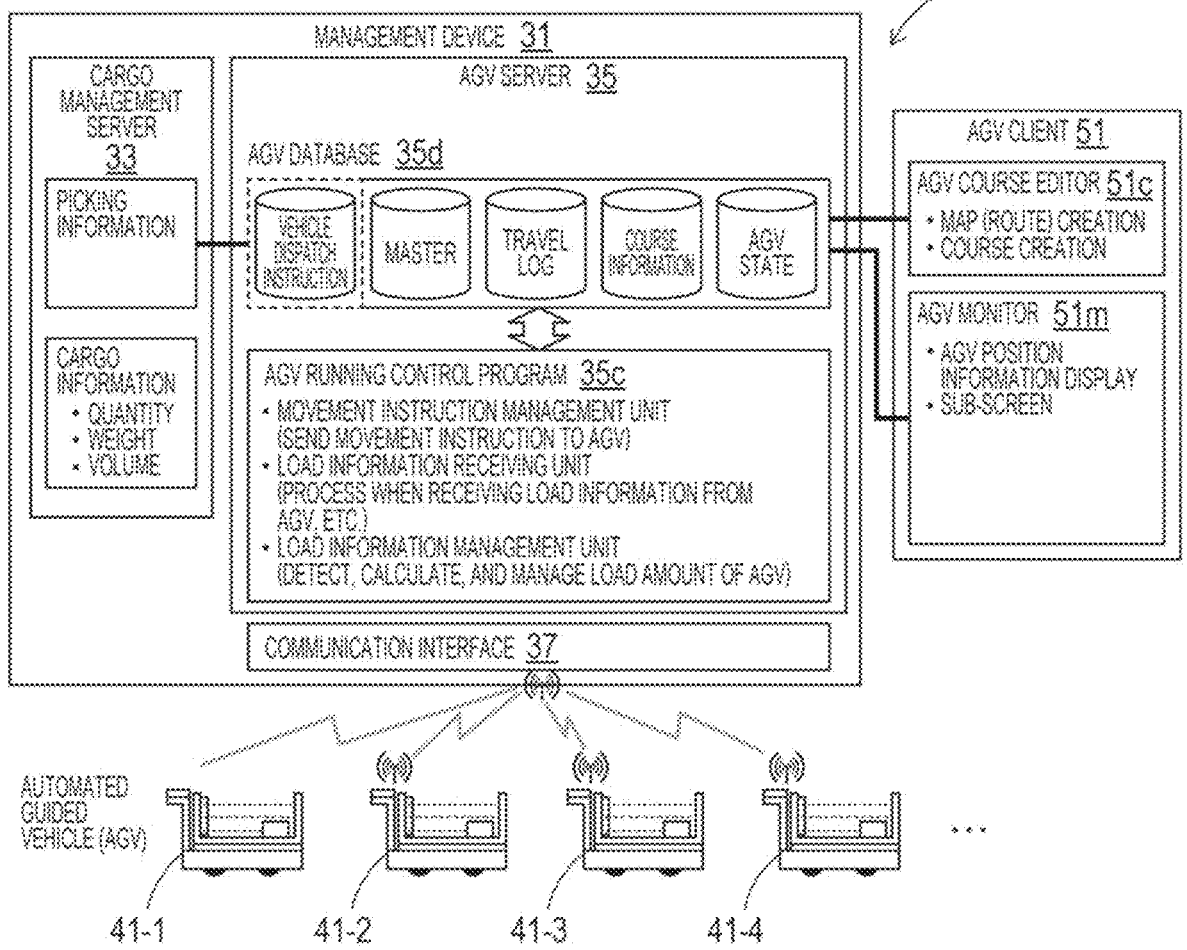
FIG. 1 is a block diagram illustrating the overall configuration of a cargo transport system according to an embodiment.

FIG. 1 is a block diagram illustrating the overall configuration of a cargo transport system according to this embodiment. As illustrated in FIG. 1, the cargo transport system is constituted mainly by a management device 31 and a plurality of automated guided vehicles (AGVs 41-1, 41-2, 41-3, . . . ). Further, the cargo transport system preferably includes an AGV client 51.

The management device 31 includes a cargo management server 33 that manages the places, quantities, weights, etc. of cargos to be handled and an AGV server 35 that performs running management of and communication with the automated guided vehicles (also referred to as automatic guided vehicle or AGVs). The cargo management server 33 and the AGV server 35 are illustrated as an integrated device in FIG. 1 but, in another form, may be devices independent of each other. However, in the other form, data can be exchanged between the two devices.

The cargo management server 33 stores and manages picking information. The picking information is information indicating that, for example, cargos to be transported are placed on which parts shelves at which positions and indicating that which ones and how many of the cargos are to be transported to where.

Further, the cargo management server 33 stores and manages cargo information. Here, the cargo information includes the quantities of cargos stored on the parts shelves and may further include information about the weights, volumes, etc. of the cargos.

The AGV server 35 stores an AGV database 35$d$ that includes information necessary for running of the automated guided vehicles and an AGV running control program 35$c$ for controlling running of the automated guided vehicles in a nonvolatile storage device. Although not illustrated in detail in FIG. 1, the AGV server 35 includes a dedicated CPU or a CPU shared with the cargo management server 33, and the CPU performs processing in accordance with the AGV running control program 35$c$ to thereby function as a movement instruction management unit and a load amount management unit.

Further, the management device 31 includes a communication interface 37 for wirelessly communicating with the automated guided vehicles. The wireless communication method for the communication interface 37 is a method compliant with, for example, a Wi-Fi standard; however, the method is not limited to this and may be another method, such as Zigbee.

The AGV client 51 is an information processing terminal that can communicate with the management device 31 and is used by the user to create a map indicating routes along which the AGVs can travel and to monitor the states of the AGVs.

The AGV client 51 stores a control program, namely, an AGV course editor 51*c* for registering course information about courses to be traveled by the automated guided vehicles and an AGV monitor 51*m* for monitoring the states of the automated guided vehicles, in a nonvolatile storage device. Although not illustrated in FIG. 1, the AGV client includes a CPU, and the CPU executes the above-described control program. Note that a configuration is possible in which the management device 31 also has the functions of the AGV client 51.

When the CPU of the AGV client 51 executes the AGV course editor, routes along which the automated guided vehicles travel, position information about branch points and turning points, and position information for stopping are defined. The travel routes correspond to, for example, routes to which magnetic tapes are attached on the floor surface over which the AGVs travel, and are stored in the nonvolatile storage device as course information. The course information is data for defining a map that corresponds to the actual travel routes that are laid on the premises and to which the magnetic tapes are attached.

When the CPU executes the AGV course editor 51*c*, a screen is displayed on a monitor of the AGV client 51 not illustrated in FIG. 1, and the user can create a map indicating aisles along which parts shelves are arranged and the AGVs can travel and the positions of loading operation places, an unloading place, a waiting place, etc. on the screen. The user uses the AGV course editor 51*c* to create a map that corresponds to the aisles laid on the premises.

When the CPU executes the AGV monitor 51*m*, the positions of the respective AGVs are displayed on the monitor of the AGV client not illustrated in FIG. 1 in real time on the basis of log information transmitted from the automated guided vehicles.

The CPU of the AGV server 35 executes the AGV running control program 35*c* to perform the following processing. The CPU of the AGV server 35 creates tasks (picking list) on the basis of position information about the AGVs from the AGV client 51 and the picking information from the cargo management server 33. The CPU of the AGV server 35 selects an automated guided vehicle (for example, the AGV 41-1) that is available for operations, determines a travel course to be followed by the selected AGV 41-1 in the travel routes along which the automated guided vehicles can travel, and gives a movement instruction to the AGV 41-1 to move the AGV 41-1 to a destination place in an automated manner. Note that a loading operator who loads cargos into the AGV 41-1 is guided by the AGV 41-1 and moves to the loading operation place.

Further, the CPU that executes the AGV running control program 35*c* obtains, from the cargo management server 33, information about the positions, quantities, weights, volumes, etc. of cargos together with the picking information. The CPU successively monitors the amount of loaded cargo of each of the automated guided vehicles (in the example in FIG. 1, the AGV 41-1, the AGV 41-2, the AGV 41-3, . . . ), and calculates the ratio (load ratio) of the amount of loaded cargo to an amount of cargo that can be loaded, that is, the maximum load amount. Accordingly, at the timing at which a certain automated guided vehicle (for example, the AGV 41-2) is almost fully loaded, the CPU gives an instruction for moving another new automated guided vehicle (for example, the AGV 41-3) to the position of the automated guided vehicle (AGV 41-2) that is almost fully loaded. Accordingly, the CPU calls the next automated guided vehicle before the amount of loaded cargo reaches the maximum load amount to replace the automated guided vehicle.

<<Configuration of Automated Guided Vehicle (AGV)>>

Now, the configuration of an automated guided vehicle will be described.

Figure 2:
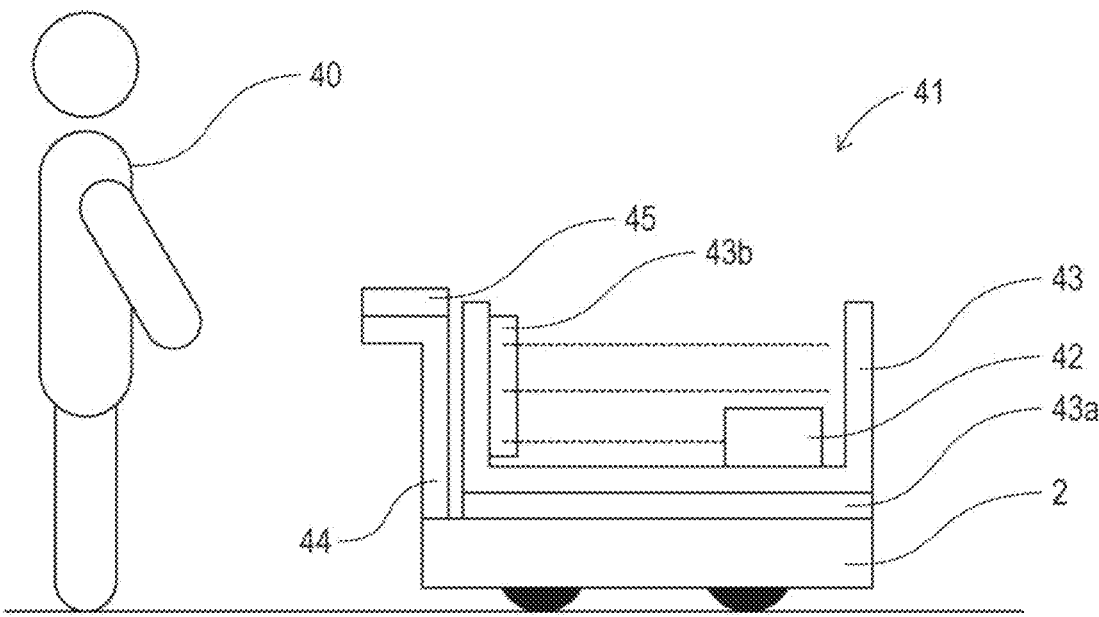
FIG. 2 is an explanatory diagram schematically illustrating the form of an AGV according to this embodiment.

FIG. 2 is an explanatory diagram schematically illustrating the form of an AGV 41 according to this embodiment. The AGV 41 illustrated in FIG. 2 is a representative one of the AGVs 41-1, 41-2, 41-3, . . . illustrated in FIG. 1.

As illustrated in FIG. 2, the AGV 41 has an AGV main body 2 over which a container part 43 into which cargos are loaded is provided. On the bottom of the container part 43, a weight sensor 43*a* that detects the weight of loaded cargos is provided. The weight sensor 43*a* can be implemented by using, for example, a strain gauge.

In addition to or instead of the weight sensor 43*a*, a volume sensor 43*b* that detects the volume (bulk) of a cargo 42 that is loaded is provided on a side wall of the container part 43. The volume sensor 43*b* can be implemented by using, for example, reflection-type infrared sensors (photo-interrupters). The photo-interrupters are arranged at a plurality of positions on one of the side walls facing each other. The other side wall is formed of, for example, a mirror-finished stainless flat plate so that an infrared beam emitted from a light emitting element of each photo-interrupter returns after reflection by the other side wall and is incident on a light receiving element of the photo-interrupter from which the infrared beam has been emitted. The photo-interrupters are arranged at different positions in the height direction and the width direction. When the cargo 42 is loaded into the container part 43, some infrared beams are interrupted. Therefore, when the presence of a returning infrared beam is detected for the photo-interrupter at each position, the approximate volume (bulk) of the cargo put into the container part 43 can be detected. Note that the photo-interrupters need not be of the above-described reflection type and may be of a transparent type. In the case of a transparent type, a light emitting element and a light receiving element for an infrared beam are arranged at corresponding positions on the respective facing side walls of the container part 43 so as to face each other.

The AGV 41 further has a stand 44 on which an operator console 45 is installed or mounted. The operator console 45 is used when an operator 40 performs an operation of loading the cargo 42 into the container part 43 at a loading operation place. Specifically, a barcode is attached in advance to the cargo 42, and the operator console 45 has a barcode reading function. The operator console 45 sends data of the read barcode to the management device 31 via the communication interface 37. The operator 40 picks the cargo 42 that is placed on, for example, a parts shelf and loads the cargo 42 into the container part 43 of the AGV 41, or loads the cargo 42 that is transported to the loading operation place by, for example, a belt conveyer into the container part 43. At the time of loading, the operator 40 has the barcode of the cargo 42 read by the operator console 45. The barcode attached to the cargo 42 is information for linking the cargo 42 with the picking information and the cargo information managed by the cargo management server 33.

The operator console 45 is integrated in the AGV 41 and may communicate with the management device 31 via the AGV 41; however, the operator console 45 need not be configured as described above and may be, for example, a hand-held terminal that is provided separately from the AGV 41. Further, information that is attached to the cargo 42 and read by the operator console 45 need not be a barcode and, for example, another means, such as an IC tag, may be used.

When barcode information of a cargo loaded into the container part 43 is read by the operator console 45, the barcode information is linked with the cargo information stored on the cargo management server 33, and at least either the weight or the volume of the cargo loaded into the container part 43 is known. Therefore, the AGV 41 need not include the weight sensor 43a or the volume sensor 43b, and the cargo transport system 11 needs to include means, such as the operator console 45, for obtaining the amount of cargo loaded into the AGV.

The operator console 45 may be included in the configuration of the AGV 41; however, the operator console 45 need not be included in the AGV 41 and may be regarded as a terminal that communicates with the management device 31. That is, the operator console 45 need not communicate with the management device 31 via the AGV 41 but may directly communicate with the management device 31.

The AGV 41 according to this embodiment travels along a line 1 for travel guiding laid on the floor surface.

The line 1 is disposed on the travel routes along which the AGV 41 travels, and is formed of the magnetic tapes that are attached to the travel routes in this embodiment.

Figure 3:
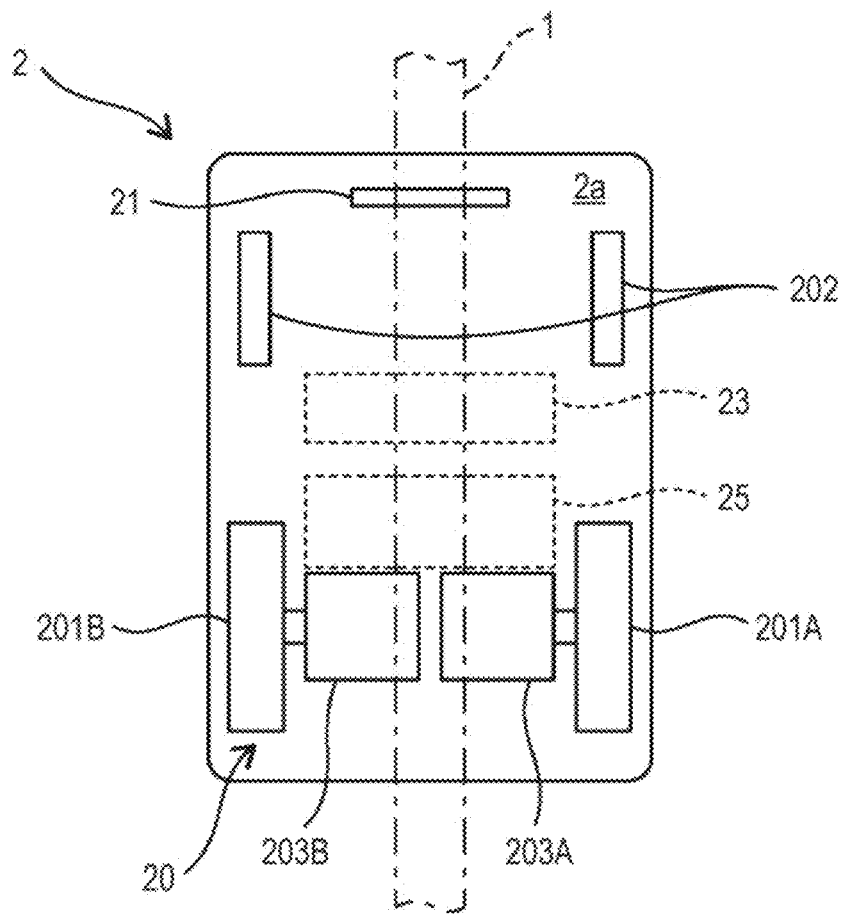
FIG. 3 is a bottom view of the arrangement on the bottom surface of an AGV main body concerning traveling in the AGV illustrated in FIG. 2.
Figure 4:
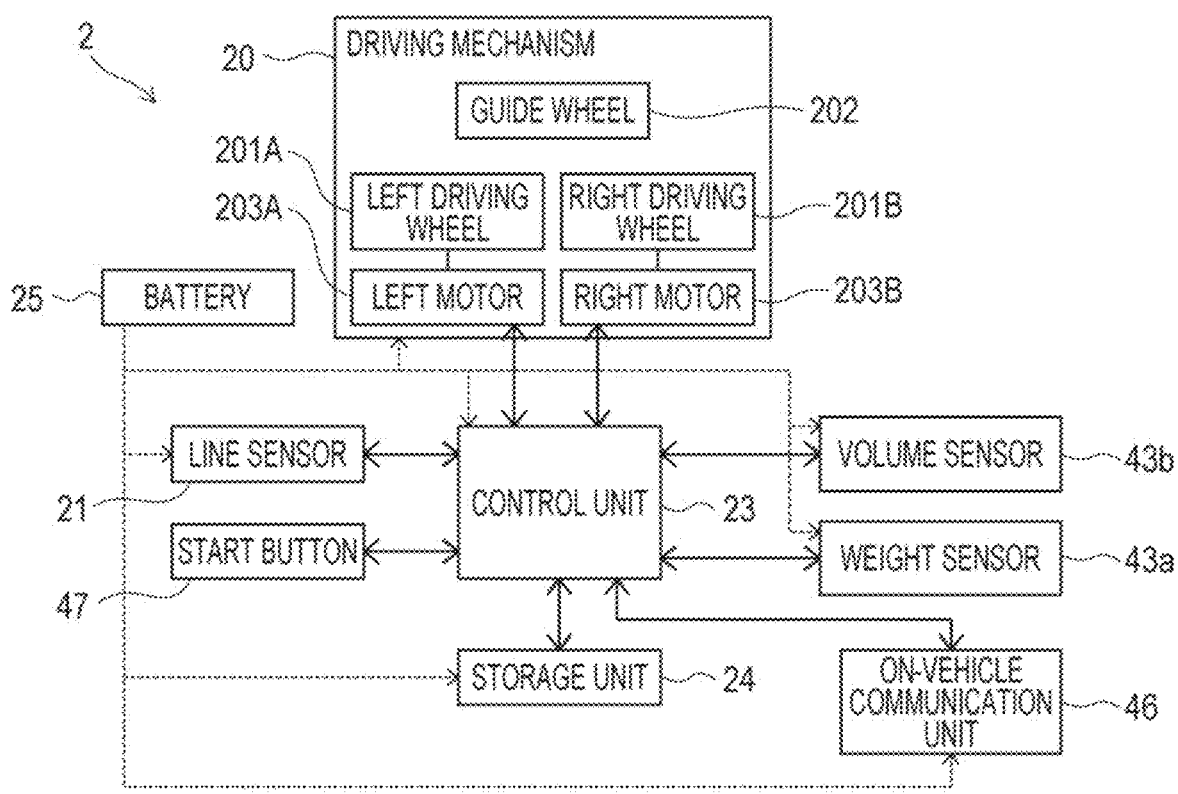
FIG. 4 is a block diagram illustrating the configuration of the AGV main body illustrated in FIG. 2.

FIG. 3 is a bottom view of the arrangement on the bottom surface of the AGV main body 2 concerning traveling in the AGV 41 illustrated in FIG. 2. FIG. 4 is a block diagram illustrating the configuration of the AGV main body 2 illustrated in FIG. 2. As illustrated in FIG. 3 and FIG. 4, the AGV main body 2 includes a driving mechanism 20 that is responsible for motions, such as advancing, turning, etc., a line sensor 21 that detects the line 1, a control unit 23 that controls motions of the AGV main body 2, a storage unit 24, and a battery 25 that supplies power to the units.

The AGV main body 2 further includes the weight sensor 43a and the volume sensor 43b illustrated in FIG. 2, and an on-vehicle communication unit 46 that is a communication interface with the management device 31 and a start button 47 that is operated by the operator 40 for informing the AGV main body 2 of a travel start timing.

The control unit 23 obtains detection results from the weight sensor 43a and the volume sensor 43b and recognizes a press of the start button.

The driving mechanism 20 includes a left driving wheel 201A, a right driving wheel 201B, guide wheels 202 that support the AGV main body 2 together with these driving wheels, a left motor 203A that rotates the left driving wheel 201A, and a right motor 203B that rotates the right driving wheel 201B. The left motor 203A and the right motor 203B can be separately and independently controlled. On the other hand, the rotation direction and rotation speed of the left motor 203A and those of the right motor 203B are controlled by the control unit 23 in association with each other.

The control unit 23 controls motions of the AGV main body 2 on the basis of a detection result from the line sensor 21 and a movement instruction received from the management device 31. The motions of the AGV main body 2 include travel motions in which the AGV main body 2 travels along the line 1 and predetermined motions that are motions set in advance and are different from the travel motions. Note that a travel motion that is different from a usual travel motion (for example, a travel motion in which the speed is changed) can be regarded as a predetermined motion.

The on-vehicle communication unit 46 is a unit via which the AGV 41 communicates with the management device 31. Further, the on-vehicle communication unit 46 may communicate with other devices, such as the operator console 45 illustrated in FIG. 2.

A predetermined motion may be a single motion of stopping, clockwise turning, counterclockwise turning, speed change, etc. or may be a motion in which various motions including advancing are combined. Clockwise turning is a motion in which the AGV main body 2 turns clockwise at a predetermined angle (for example, 90° or 180°) set in advance. Counterclockwise turning is a motion in which the AGV main body 2 turns counterclockwise at a predetermined angle (for example, 90° or 180°) set in advance. An example of the predetermined motion formed by combining a plurality of motions is a motion in which the AGV main body 2 turns clockwise, and thereafter, resumes traveling. Another example is a motion in which the AGV main body 2 stops for a predetermined time set in advance, and thereafter, resumes traveling (temporary halt). Note that the predetermined motions to be performed by the AGV main body 2 are not limited to those related to traveling of the AGV main body 2, and various motions, such as cooperative motions with a power feeding device or a conveyer and cooperative motions with a cart, can be employed.

Figure 5:
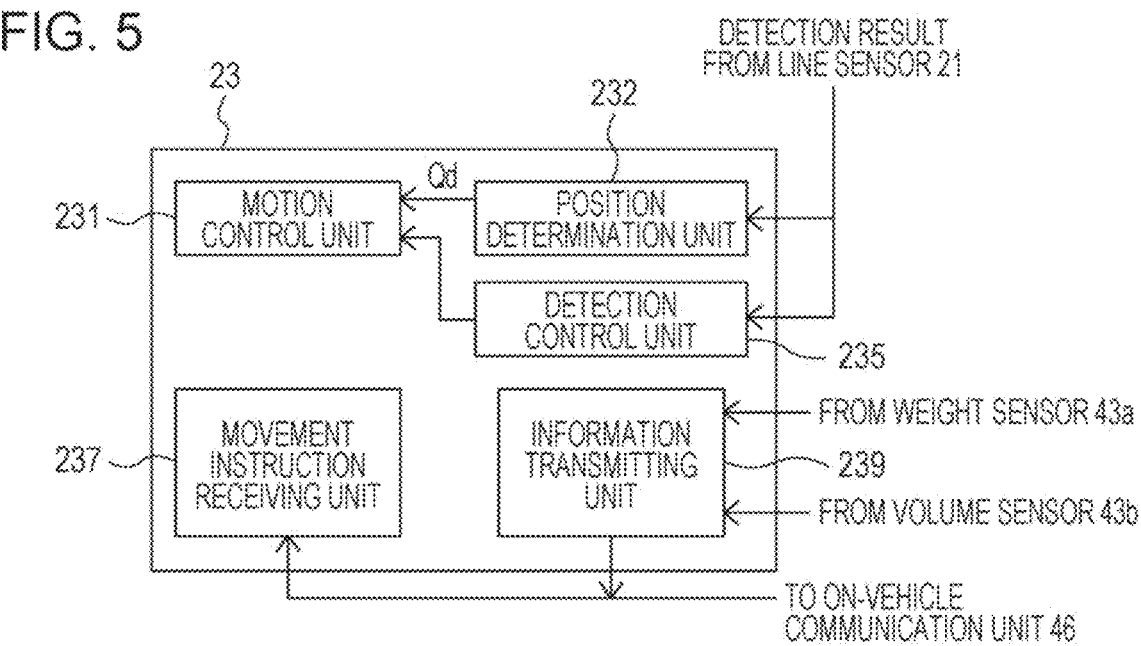
FIG. 5 is a block diagram illustrating the configuration of a control unit 23 illustrated in FIG. 4.

FIG. 5 is a block diagram illustrating the configuration of the control unit 23 illustrated in FIG. 4. As illustrated in FIG. 5, the control unit 23 includes a motion control unit 231, a position determination unit 232, a detection control unit 235, a movement instruction receiving unit 237, and an information transmitting unit 239.

The control unit 23 performs processing in each unit to thereby perform traveling of the AGV 41. Note that, as the control unit 23, any control processing device, such as a CPU or a microcomputer, can be employed. The processing performed by the control unit 23 may be performed on the basis of a series of corresponding computer programs. Such computer programs may be stored in a storage medium (for example, a flash memory) so as to be readable or may be stored in the storage unit 24.

The motion control unit 231 controls the rotation of the left motor 203A and that of the right motor 203B to thereby cause the AGV 41 to travel. During traveling, the position determination unit 232 determines the detection position Qd of the line 1 in the line sensor 21 on the basis of a detection result from the line sensor 21. The motion control unit 231 causes the AGV 41 to travel along the line 1.

On the other hand, the detection control unit 235 detects the width W of the line 1 by using the line sensor 21. The line 1 is drawn on the floor surface along a course to be traveled by the AGV 41 with the width W1, which is a reference width; however, the drawn line 1 has widened portions having a width W2 wider than the reference width W1 at positions at which the AGV 41 is caused to perform predetermined motions described above different from usual traveling. The positions at which the AGV 41 is caused to perform predetermined motions include, for example, a loading operation place or an unloading place at which the AGV 41 is to be stopped for loading or unloading cargos and a position at which the AGV 41 is caused to perform a rotation motion or at which the travel speed is to be changed.

In a case where the detection control unit 235 determines that the detected width of the line 1 is the width of a widened portion, the motion control unit 231 causes the AGV 41 to perform a predetermined motion (for example, stopping) in accordance with a movement instruction from the AGV server 35. Note that, as the predetermined motion, various motions including clockwise turning, counterclockwise turning, and speed change described above, in addition to stopping can be employed.

Note that, instead of providing the widened portions on the line 1, a form is possible in which RFID tags, etc. are laid on the travel routes of the AGVs. An AGV reads a laid RFID tag and communicates with the AGV server 35 on the basis of read information. The AGV server may grasp the position of each AGV, send a movement instruction, and cause the AGV to perform a predetermined motion at a predetermined position.

The movement instruction receiving unit performs processing in a case where the on-vehicle communication unit 46 receives a movement instruction from the management device 31 through communication with the management device 31.

The information transmitting unit performs processing for transmitting load information based on detection by the weight sensor 43a and the volume sensor 43b to the management device 31 via the on-vehicle communication unit 46.

<<Processing Concerning Next Vehicle Calling>>

An example process for calling the next vehicle before the amount of loaded cargo of the AGV 41 reaches the maximum load amount will be described with reference to flowcharts. As described above, as the configuration of the cargo transport system 11 and that of the configuration of the AGV 41, various forms are possible. Specifically, the form in which the AGV 41 detects at least either the weight or the volume of cargo has been described as means for detecting the amount of loaded cargo. Apart from such detection means, the possible form has been described in which the type and quantity of loaded cargo are identified by using the operator console 45, the cargo information in which cargos and at least either the volume or the weight thereof are associated with each other is referenced, and the amount of loaded cargo is obtained. As a matter of course, a form obtained by combining these forms is possible.

The AGV 41 illustrated in FIG. 2 employs a form that encompasses these forms, that is, the form in which the AGV 41 includes the weight sensor 43a, the volume sensor 43b, and the operator console 45. However, the AGV 41 need not include all of these and need to only obtain the amount of loaded cargo by any of these means.

The following description is given under the assumption that the AGV 41 includes only the volume sensor 43b and does not include the weight sensor 43a. Further, it is assumed that the operator console 45 is used by the cargo management server 33 to manage cargos but is not used in a process for determining the amount of loaded cargo of the AGV 41 and for calling the next AGV 41. The control unit 23 sends, to the management device 31, load information that serves as a signal for calling the next AGV 41 on the basis of an amount of loaded cargo detected by the volume sensor 43b.

Note that another form is possible in which, for example, the management device 31 obtains information about loaded cargos (load information) from the operator console 45, references the cargo information stored on the cargo management server 33, and calls the next AGV. In this case, not the AGV 41 but the operator console 45 is responsible for providing the load information. However, the process flow is similar in that the CPU of the AGV server 35 executes the AGV running control program 35c and that the movement instruction management unit that has obtained the load information calls the next AGV, and therefore, a person skilled in the art can easily apply the following description to modifications.

Figure 6:
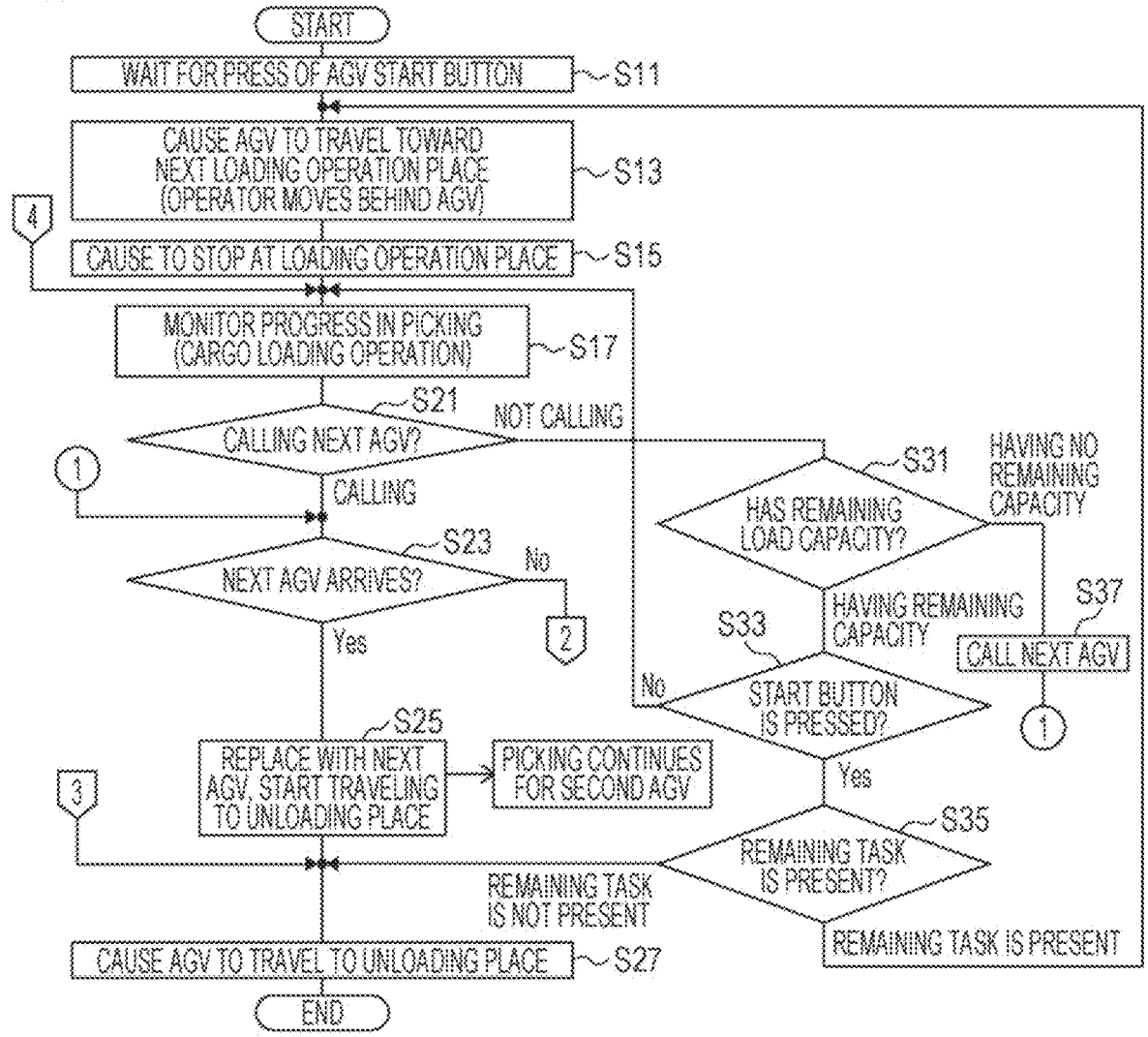
FIG. 6 is a flowchart illustrating a basic process concerning calling of the next vehicle among processes that are performed by the control unit of the AGV in this embodiment.
Figure 7:
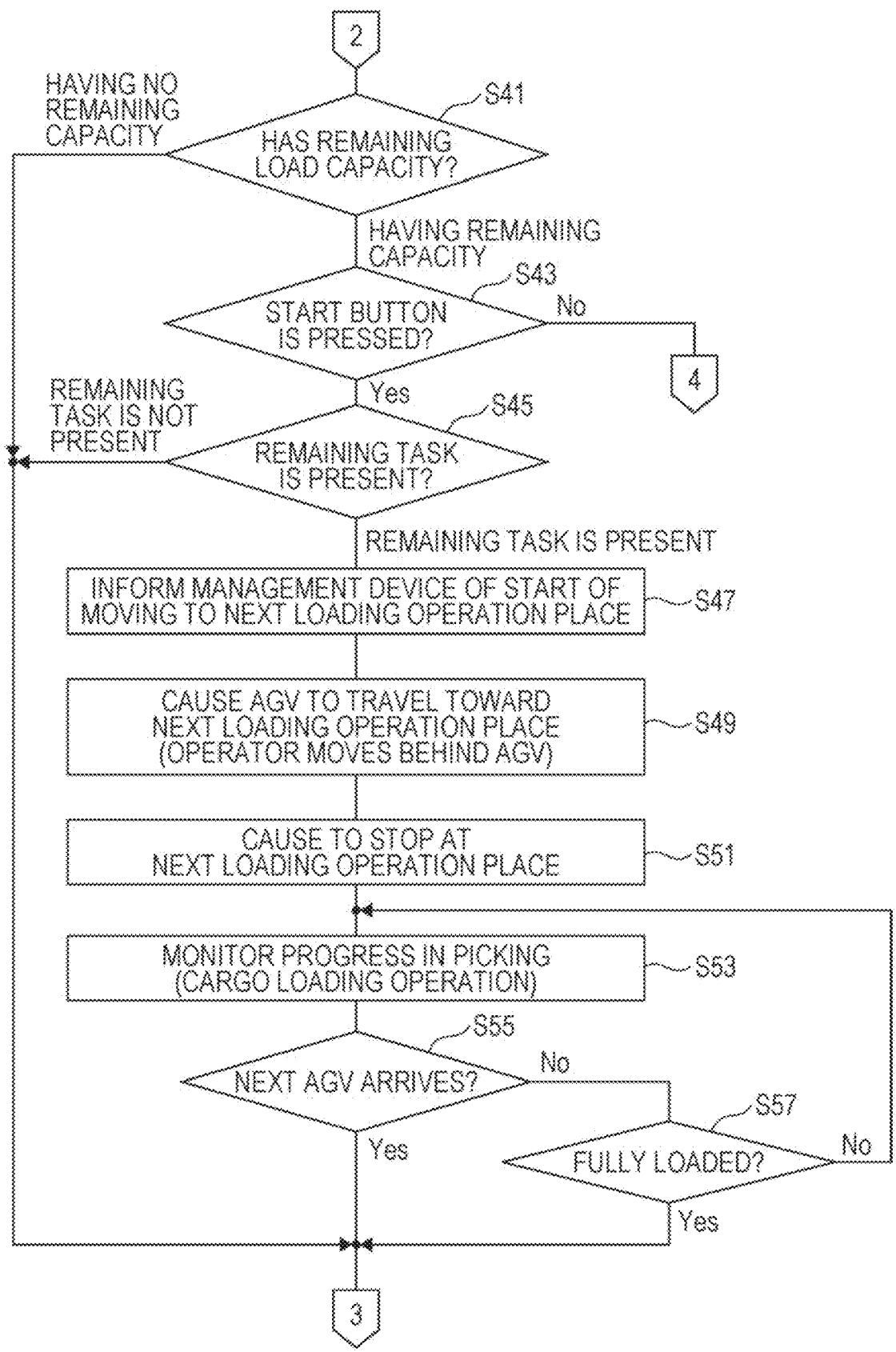
FIG. 7 is a flowchart illustrating a process that is performed during a period in which the arrival of the next vehicle is awaited after calling of the next vehicle among the processes that are performed by the control unit of the AGV in this embodiment.

FIG. 6 is a flowchart illustrating a basic process concerning calling of the next vehicle among processes that are performed by the control unit 23 of the AGV 41. FIG. 7 is a flowchart illustrating a process up to the arrival of the next vehicle after calling of the next vehicle.

The CPU of the AGV server 35 executes the AGV running control program 35c to create a picking list indicating which ones among the cargos placed on parts shelves are to be picked from the parts shelves and to be transported to an unloading place, namely, the details of picking. The CPU of the AGV server 35 sends movement instructions to the AGVs 41-1, 41-2, 41-3, . . . in accordance with the created picking list. Hereinafter, a representative AGV is referred to as the AGV 41, and a description is given. The control unit 23 of the AGV 41 causes the AGV 41 to travel to a loading operation place in accordance with the movement instruction. The operator 40 moves behind the AGV 41. Picking is, for example, an operation of collecting a plurality of products in accordance with an order from a customer, etc. in a distribution warehouse and packing and shipping the products. In another example, picking is an operation of collecting, in order to replenish parts necessary for assembly processes in an assembly line, the parts to be replenished from a parts travel and transporting the parts for the assembly processes.

As illustrated in FIG. 6, when the operator 40 presses the start button 47, the control unit 23 recognizes the press (step S11) and informs the management device 31 that the start button 47 is pressed. The control unit 23 causes traveling of the AGV 41 to start and causes the AGV 41 to travel to a first loading operation place for loading cargos in accordance with a movement instruction from the AGV server 35 (step S13).

When the AGV 41 reaches the destination position, the control unit 23 causes the AGV 41 to stop at the position (step S15). The operator 40 checks, on the operator console 45, cargos to be picked from a shelf located at the position. The operator 40 performs an operation (picking) of picking the cargos specified in the picking list and loading the cargos into the container part 43 of the AGV 41.

The control unit 23 monitors detection by the volume sensor 43b to thereby monitor the progress in cargo loading (step S17). The control unit 23 monitors whether the ratio of the volume of the loaded cargos to the maximum load capacity exceeds a criterion value determined in advance in terms of volume. Specifically, in a case other than the case where the control unit 23 has called the next AGV in step S33 described below ("not calling" in step S21), the control unit 23 monitors the load amount while the cargo loading is ongoing, and determines whether the volume of the loaded cargos exceeds the criterion value. That is, the control unit 23 determines whether the AGV still has a remaining load capacity for cargos (step S31).

While the AGV has a remaining load capacity ("having remaining capacity" in step S31), the control unit 23 waits for the start button 47 to be pressed (step S33). A press of the start button 47 is a signal for the operator 40 to inform the control unit 23 of completion of picking at the current loading operation place.

As long as the start button 47 is not pressed (No in step S33), the routine returns to step S17 described above, and the control unit 23 continues monitoring the load amount while the loading operation is ongoing.

When the start button 47 is pressed (Yes in step S33), the control unit 23 informs the management device 31 that the start button 47 is pressed. The control unit 23 references the picking list and checks whether cargos to be transported (cargos to be loaded) remain, that is, whether a remaining task is present (step S35).

If a remaining task is not present, the control unit 23 causes the AGV 41 to travel to the unloading place (step S27).

If a remaining task is present, the routine returns to step S13, and the control unit 23 causes the AGV to travel to the next loading operation place.

Alternatively, the management device 31 that receives a notification indicating that the start button 47 is pressed may reference the picking list and check whether a remaining task is present. If a remaining task is not present, the management device 31 may send a movement instruction for causing the AGV 41 to travel to the unloading place, and if a remaining task is present, the management device 31 may send a movement instruction for moving to the next loading operation place.

On the other hand, in a case where the volume of the loaded cargos exceeds the criterion value in step S31 described above ("having no remaining capacity" in step S31), the control unit 23 transmits, to the management device 31, load information that triggers calling of the next AGV (step S37). When receiving the load information from the AGV 41, the CPU of the management device 31 executing the AGV running control program 35c causes the next AGV having a capacity for loading to travel to the current loading operation place.

Note that, with reference to this flowchart, the form has been described in which the control unit 23 of the AGV 41 determines whether the volume of loaded cargos exceeds the criterion value and, in a case where the volume of loaded cargos exceeds the criterion value, the control unit 23 of the AGV 41 transmits load information as a signal for calling the next AGV. Another form is possible in which the control unit 23 transmits detection values from the volume sensor 43b to the management device 31 one after another. When detection values are transmitted one after another, for example, a detection value may be repeatedly transmitted as the time passes or a detection value may be transmitted in a case where it is determined that a change occurs in the detection value of the volume. In this form, detection values from the volume sensor 43b that are transmitted one after another correspond to load information. In the form, the CPU that executes the AGV running control program 35c, that is, the movement instruction management unit, determines whether the volume of loaded cargos exceeds the criterion value and causes the next AGV to start.

Referring back to the flowchart, and a description is further given. After transmitting the load information and calling the next AGV in step S37 described above, the routine proceeds to step S23. The control unit 23 waits for the next AGV to arrive (step S23).

When the next AGV arrives (Yes in step S23), and replacement is completed (step S25), the control unit 23 causes the AGV 41 to travel to the unloading place (step S27).

The operator 40 who has moved behind the AGV 41 remains at the loading operation place, continues the ongoing picking, and loads the remaining cargos into the next AGV.

On the other hand, while the control unit 23 waits for the arrival of the next AGV in step S23 described above (No in step S23), the control unit 23 further performs a process illustrated in the flowchart in FIG. 7. However, prior to the description of the process in FIG. 7, the basic process concerning the next vehicle is further described.

As illustrated in FIG. 6, the control unit 23 detects the amount of cargos loaded into the AGV 41 and transmits load information for calling the next AGV before the container part 43 is fully loaded.

The timing at which load information is to be transmitted is the timing when, for example, the total volume of cargos put into the container part 43 exceeds 80% of the maximum capacity, that is, the load ratio exceeds 80%.

The next AGV that is called for replacement is an empty AGV from which cargos have been unloaded at the unloading place (for example, a packaging place or a releasing place) and that is located at a waiting place where the AGV waits for the start of next cargo transport.

In a first case, the operator 40 continues picking after the volume of loaded cargos exceeds 80% of the maximum capacity, and the AGV is fully loaded or substantially fully loaded at this loading place.

In this case, after the operator 40 confirms that the next AGV arrives during picking, the operator 40 presses the start button of the AGV 41 that is fully or substantially fully loaded. In response to this operation, the control unit 23 moves the AGV 41 to the unloading place in an automated manner.

When the AGV 41 arrives at the unloading place, the cargos put into the container part 43 are unloaded from the AGV 41 manually or automatically. Thereafter, the empty AGV 41 waits at the waiting place described above.

In the above-described first case, the process is performed within the scope illustrated by the flowchart in FIG. 6.

In a second case, the operator 40 continues picking after the volume of loaded cargos exceeds 80% of the maximum capacity, and the operation is completed before the AGV is fully loaded or substantially fully loaded at this loading place. In an example of this case, the operation of loading all cargos at this loading place is completed in a state where the amount of loaded cargos of the AGV 41 does not reach 100% and cargos are loaded up to 90% of the maximum capacity. In this case, the control unit 23 may cause the AGV 41 to move to the unloading place as in the first case; however, the control unit 23 may cause the AGV 41 to move to the next loading place in response to pressing of a selection button by the operator because 10% of the load capacity still remains. In a case of moving the AGV 41 to the next loading place, the moving destination of the next AGV is automatically updated to the next loading place, and the next AGV travels toward the next loading place in an automated manner.

For the above-described second case, a flowchart that complements FIG. 6 is illustrated in FIG. 7, and the process is performed within the scope illustrated by the flowcharts in FIG. 6 and FIG. 7.

While the control unit 23 waits for the arrival of the next AGV in step S23 in FIG. 6 (No in step S23), the control unit 23 monitors the load amount while the cargo loading is ongoing, and determines whether the volume of loaded cargos exceeds a criterion value, as illustrated in the flowchart in FIG. 7. That is, the control unit 23 determines whether the AGV still has a remaining load capacity for cargos (step S41 in FIG. 7).

While the AGV has a remaining load capacity ("having remaining capacity" in step S41), the control unit 23 waits for the start button 47 to be pressed (step S43). That is, the control unit 23 waits for a signal used by the operator 40 to inform the control unit 23 of completion of picking at the current loading operation place.

As long as the start button 47 is not pressed (No in step S43), the routine returns to step S17 in FIG. 6, and the control unit 23 continues monitoring the load amount while the loading operation is ongoing.

When the start button 47 is pressed (Yes in step S43), the control unit 23 informs the management device 31 that the start button 47 is pressed. The control unit 23 references the picking list and checks whether a remaining task (cargos to be loaded) is present (step S45). If a remaining task is not present, the routine proceeds to step S27 in FIG. 6, and the control unit 23 causes the AGV 41 to travel to the unloading place.

Alternatively, the management device 31 that receives a notification indicating that the start button 47 is pressed may reference the picking list, check the presence of a remaining task, and if a remaining task is not present, send a movement instruction for causing the AGV 41 to travel to the unloading place.

If a remaining task is present ("remaining task is present" in step S45), the control unit 23 informs the management device 31 that the AGV 41 is to be moved toward the next loading operation place (step S47). Alternatively, the management device 31 that receives a notification indicating that the start button 47 is pressed checks the presence of a remaining task, and if a remaining task is present, sends a movement instruction for moving to the next loading operation place. The control unit 23 that receives the movement instruction informs the management device 31 of moving in accordance with the movement instruction.

When the management device 31 receives the notification indicating that the AGV 41 moves to the next loading operation place, the management device 31 updates the movement instruction that has been sent to the next AGV, which is triggered by the load information transmitted in step S37 in FIG. 6. That is, the management device 31 newly sends a movement instruction for moving the next AGV to the loading operation place that is specified as the moving destination of the AGV 41 in step S47.

Thereafter, the control unit 23 of the AGV 41 causes the AGV 41 to travel toward the next loading operation place (step S49).

When the AGV 41 arrives at the next loading operation place, the control unit 23 causes the AGV 41 to stop at the position (step S51). The operator 40 performs an operation of cargo loading at the loading operation place.

The control unit 23 monitors the progress in the loading operation (step S53). The control unit 23 checks whether the next AGV arrives (step S55). When the control unit 23 receives a notification of the arrival of the next AGV from the management device 31 (Yes in step S55), the routine proceeds to step S27 in FIG. 6, and the control unit 23 causes the AGV 41 to travel to the unloading place.

If the next AGV does not arrive (No in step S55), the control unit 23 checks whether the AGV 41 is fully loaded (step S57).

If the AGV 41 is fully loaded (Yes in step S57), the routine proceeds to step S27 in FIG. 6, and the control unit 23 causes the AGV 41 to travel to the unloading place. If the AGV 41 is not fully loaded, the routine returns to step S53, and the control unit 23 continues monitoring the loading operation, that is, continues monitoring the load amount.

According to this embodiment, before the AGV is fully loaded, the next AGV is called, and therefore, the operator 40 need not pay attention to the load amount of the AGV. Further, the operator 40 need not go to the waiting place for the next AGV. The operator 40 can concentrate on picking, and therefore, efficient picking is made possible. Even in a case where the next AGV that is called for replacement starts moving, and thereafter, the AGV 41 on the calling side moves to the next loading operation place, the next AGV moves toward the next loading operation place, and therefore, efficient picking is made possible.

Second Embodiment

In the first embodiment, the process has been described in which, in a case where the volume of cargo, which is the amount of loaded cargo, exceeds the criterion value of the allowed storage capacity of the container part 43, load information is transmitted to call the next AGV.

The left driving wheel 201A and the right driving wheel 201B of the AGV are respectively driven by the left motor 203A and the right motor 203B. When cargos are loaded in excess of an allowed load weight, the driving force of the motors may become insufficient, the AGV may fail to travel, and picking may be interrupted. Further, an excessive load is applied to the motors, which may shorten the life of the motors or may lead to a trouble in the motors.

In this embodiment, instead of or in addition to the form in which the volume of cargo is obtained as the amount of loaded cargo, a form will be described in which the weight of cargo is detected, and if the weight of cargo exceeds a criterion value, the next AGV is called.

Accordingly, in this embodiment, the AGV 41 is provided with the weight sensor 41a instead of or in addition to the volume sensor 43b. The amount of loaded cargo is grasped from the viewpoint of weight, and the next AGV is called before the weight of cargo reaches an allowed load amount.

Alternatively, the amount of loaded cargo is grasped from the viewpoint of both volume and weight, and if either the volume or the weight reaches an allowed load amount, the control unit 23 determines that the AGV 41 is fully loaded. The control unit 23 transmits load information to the management device 31 before the AGV 41 is fully loaded to call the next AGV.

Figure 8:
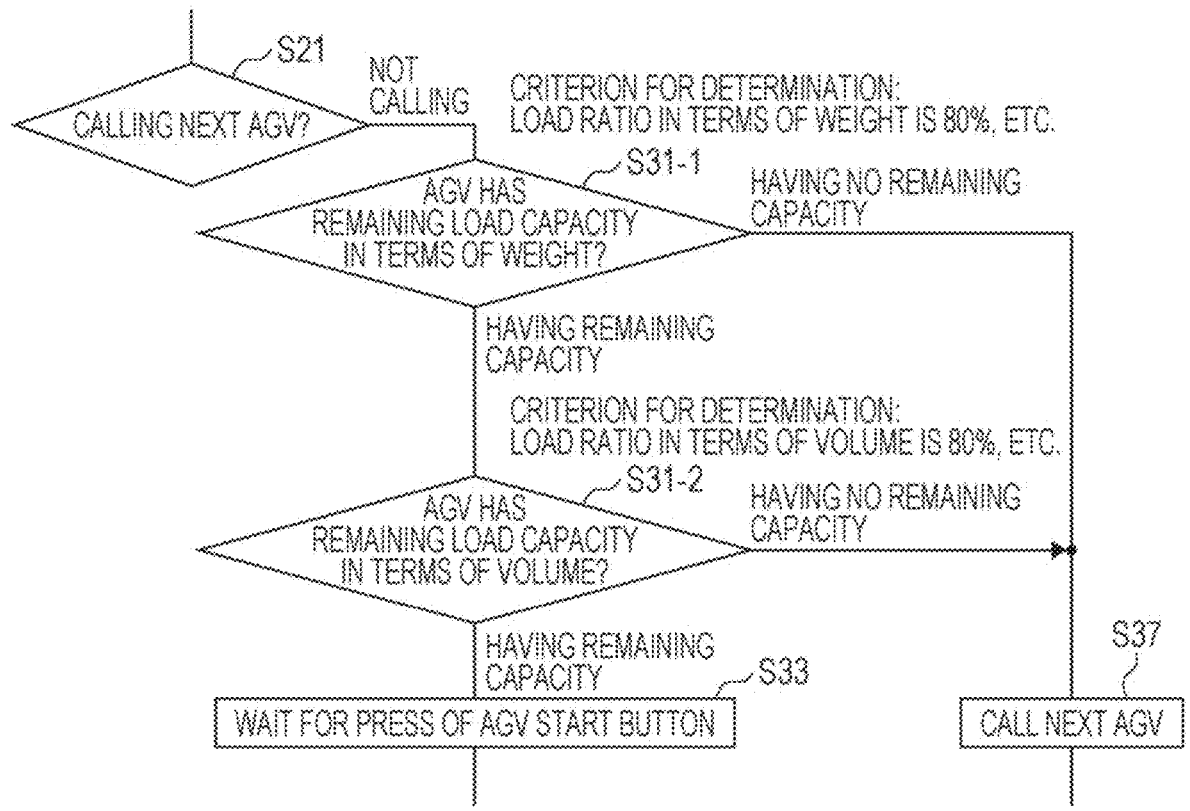
FIG. 8 is a partial flowchart illustrating a modification of the flowchart in FIG. 6.

FIG. 8 is a flowchart that corresponds to the flowchart of the first embodiment illustrated in FIG. 6 and illustrates the process in this embodiment. For easy understanding, the flowchart also includes the preceding and succeeding steps, which are assigned the same reference numerals as those in FIG. 6.

In FIG. 8, the control unit 23 monitors detection by the weight sensor 43a and the volume sensor 43b to thereby monitor the progress in cargo loading. Specifically, the control unit 23 determines whether the weight of loaded cargos exceeds a predetermined criterion value in terms of weight, that is, whether the AGV still has a remaining load capacity for cargos, while the cargo loading is ongoing (step S31-1).

If the AGV has a remaining load capacity ("having remaining capacity" in step S31-1), the control unit 23 subsequently determines whether the volume of loaded cargos exceeds a predetermined criterion value in terms of volume, that is, whether the AGV still has a remaining load capacity for cargos (step S31-2).

While the AGV has a remaining load capacity also in terms of volume ("having remaining capacity" in step S31-2), the control unit 23 waits for the start button 47 to be pressed (step S33).

On the other hand, in a case where the weight of loaded cargos exceeds the criterion value in terms of weight in step S31-1 described above ("having no remaining capacity" in step S31-1), the control unit 23 transmits, to the management device 31, load information that triggers calling of the next AGV (step S37). Similarly, in a case where the weight of loaded cargos exceeds the criterion value in terms of weight in step S31-2 described above ("having no remaining capacity" in step S31-2), the control unit 23 transmits, to the management device 31, load information that triggers calling of the next AGV (step S37).

As described above, according to this embodiment, the amount of loaded cargo is checked from the viewpoint of cargo weight or from the viewpoint of both cargo weight and cargo volume, and in a case where either the weight of cargo or the volume of cargo exceeds a criterion value, the control unit 23 transmits load information to the management device 31 to call the next AGV.

Note that, as already described, in addition to the form in which the weight of cargo is detected by providing the sensor in the AGV, the method may be employed in which the type of a loaded cargo is obtained by using the operator console 45, the cargo information managed by the cargo management server 33 is referenced, and the weight of the cargo is obtained. The same applies to the volume of cargo. Further, a form in which either of these means is used or a form in which these means are combined are possible.

Third Embodiment

In this embodiment, the control unit 23 of the AGV 41 transmits detection values of the volume or weight of loaded cargos to the management device 31 one after another as load information. Alternatively, the management device 31 uses load information about cargos sent from the operator console 45 to obtain the amount of loaded cargos of the AGV 41 each time a cargo is loaded.

The CPU of the AGV server 35 that executes the AGV running control program 35c as the movement instruction management unit changes, in accordance with the following condition, the criterion value based on which determination as to whether to call the next AGV is performed. Specifically, the CPU of the AGV server 35 changes the criterion value in accordance with the distance (hereinafter referred to as the inter-AGV distance) between the waiting place where an unloaded and empty AGV is kept waiting and an AGV for which the amount of loaded cargos exceeds the criterion value.

For example, in a case where the inter-AGV distance is shorter than a predetermined distance, the movement instruction management unit starts moving the next AGV only when the load ratio exceeds 90%. On the other hand, in a case where the inter-AGV distance is longer than the predetermined distance, the movement instruction management unit starts moving the next AGV when the load ratio reaches 80%. With this form, the criterion value based on which an instruction for starting moving of the next AGV is given is changed in accordance with the inter-AGV distance, and therefore, unlike the case of using the fixed criterion value, the timing at which the next AGV arrives is not excessively early or not excessively late, and the efficiency of picking is further improved.

Note that, in a case where a plurality of empty AGVs are kept waiting and the positions thereof differ, the movement instruction management unit can call an AGV for which the inter-AGV distance is shortest. When the movement instruction management unit selects and calls an AGV for which the inter-AGV distance is short, the number of AGVs present on a travel course along which product shelves are arranged and the time during which the AGVs are present on the travel course can be reduced, and congestion on the course can be suppressed.

Figure 9:
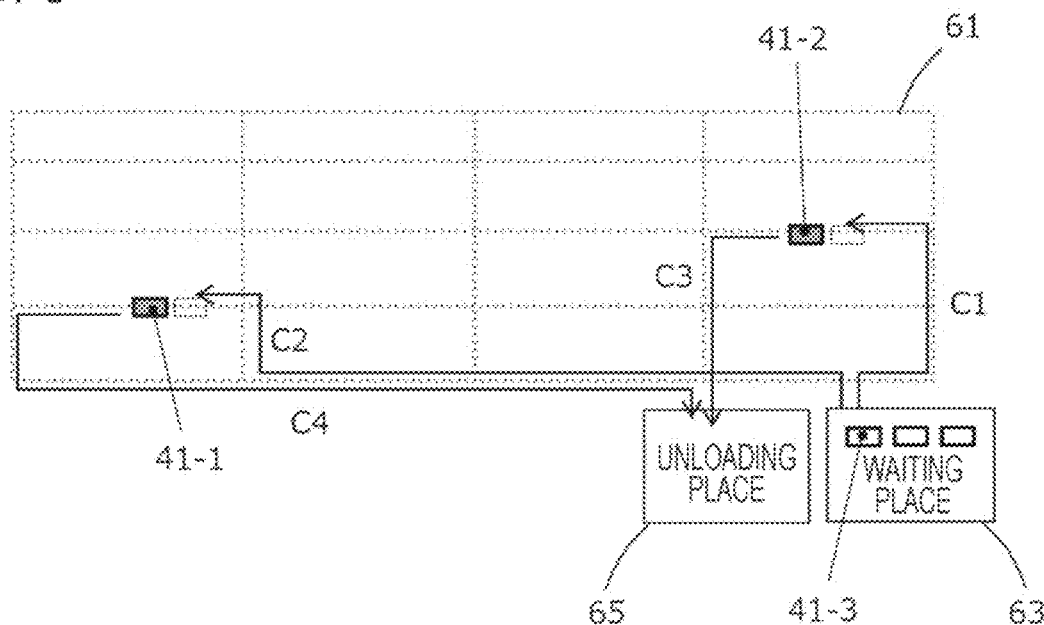
FIG. 9 is an explanatory diagram of a form in which the timing at which moving of the next AGV is started is changed in accordance with the distance between AGVs as one form of the present invention.

FIG. 9 is an explanatory diagram of an example of the form in this embodiment in which the timing at which moving of the next AGV is started is changed in accordance with the inter-AGV distance. As indicated by the chain line in FIG. 9, an AGV basically starts traveling from a waiting place 63 and travels, in accordance with a movement instruction, along a travel course 61 that is set in a grid-like form on the premises on which parts shelves are arranged. The AGV stops at the place of a parts shelf on which parts to be loaded are stored, and waits for completion of a loading operation. When the loading operation is completed, the AGV travels to a place where parts to be loaded next are stored. When loading of all the parts to be loaded is completed or the AGV is fully loaded, the AGV moves to an unloading 65. The loaded cargos are unloaded at the unloading place 65. When the cargos are unloaded and the AGV becomes empty, the automated guided vehicle returns to the waiting place 63.

In FIG. 9, a state is assumed where both of the AGVs 41-1 and 41-2 are almost fully loaded. When receiving load information from each of the AGVs 41-1 and 41-2, the AGV server 35 sends movement instructions to empty automated guided vehicles so as to move the next automated guided vehicles to the respective positions. At the waiting place 63, empty automated guided vehicles are kept waiting in a queue. The forefront one is indicated as the AGV 41-3.

For example, in a case where the AGV 41-3 moves to the position where a loading operation is performed for the AGV 41-2, the AGV 41-3 travels along the travel course C1 indicated by an arrow in FIG. 9. In a case where the AGV 41-2 is located at the loading operation place at the time point when the AGV 41-3 reaches the end point of the travel course C1, the AGV 41-3 stops at a position near the AGV 41-2 and a predetermined distance away from the AGV 41-2 (a specified position indicated by a thin line in FIG. 9). The position the predetermined distance away from the AGV 41-2 may be specified by the AGV server 35. Alternatively, each AGV may include an ultrasonic sensor, etc. (not illustrated in FIG. 4) and detect an obstacle ahead of the AGV on the travel path (in this case, the AGV 41-2). When the AGV 41-3 detects the AGV 41-2, which is an obstacle ahead of the AGV 41-3, with the ultrasonic sensor, the control unit 23 of the AGV 41-3 causes the AGV 41-3 to stop at a position the predetermined distance short of the obstacle.

In a case where the AGV 41-2 has already started traveling to the unloading place and is away from the loading operation place, the AGV-43 stops at the loading operation place (the place where the AGV 41-2 is located in FIG. 9). Note that the AGV 41-2 that is fully loaded moves to the unloading place 65 along the travel course C3.

On the other hand, in a case where the AGV 41-3 moves to the loading operation place of the AGV 41-1, the AGV 41-3 travels along the travel course C2. The AGV 41-1 that is fully loaded moves to the unloading place 65 along the travel course C4.

The AGV server 35 sends a movement instruction at a timing based on the lengths of the travel courses C1 and C2, that is, the distance up to the destination position that is traveled by an empty automated guided vehicle in accordance with a movement instruction.

For example, for the AGV 41-2, the AGV server 35 sends a movement instruction for moving the next automated guided vehicle from the waiting place 63 when the load ratio reaches 90%. On the other hand, for the AGV 41-1, the AGV server 35 sends a movement instruction when the load ratio reaches 80%. The length of the travel course C2 up to the AGV 41-1 is longer than the length of the travel course C1 up to the AGV 41-2, and therefore, the AGV server 35 sends an instruction for moving the AGV 41-3 to the position of the AGV 41-1 in a stage in which the remaining capacity is relatively large.

Fourth Embodiment

In this embodiment, the movement instruction management unit controls the timing at which the next AGV is caused to start traveling, in accordance with the operation speed of the operator.

The operation time taken for picking changes depending on the operator. For example, it is considered that the operation time taken for picking changes depending on whether the operator 40 is a highly skilled operator or a beginner. As a matter of course, it is expected that a highly skilled operator performs operations more quickly. Therefore, such a highly skilled operator can load more products until the next AGV arrives. In addition to the skill level, the picking operation speed may differ depending on the physical conditions of the operator.

Accordingly, the movement instruction management unit learns the degree of the operation speed of the operator on the basis of, for example, the position of the AGV 41, information obtained from the operator console 45, and the time when the start button 47 is pressed, and adjusts the criterion value of the load ratio based on which the next AGV is called. For an operator having a high operation speed, the criterion value is set to a value lower than usual (for example, a load ratio of 70%).

On the other hand, an operator having a normal operation speed is unable to load many products until the next AGV arrives. Therefore, the criterion value of the load ratio is set to a higher value (for example, 80%).

With this form, when the criterion value is adjusted in accordance with the operation speed of the operator, the occurrence of a situation where the next AGV arrives in a state where the load ratio is low or a situation where the next AGV does not arrive even if the AGV is fully loaded can be suppressed. Therefore, it is possible to maintain high productivity and to prevent the operator from being confused.

Note that the criterion value may be calculated by the movement instruction management unit on the basis of the records of the picking speed of the operator, as described above, but may be set to any value by the user.

The above description will be summarized below.

(i) A cargo transport system according to the present invention is a cargo transport system including: a management device; and a plurality of automated guided vehicles. Each of the automated guided vehicles includes: a movement instruction receiving unit that receives, from the management device, a movement instruction for moving to at least one loading operation place where a loading operation of loading a cargo to be transported into the automated guided vehicle is performed or a specified position near the loading operation place; an information transmitting unit that transmits, to the management device, load information concerning a load state of the cargo loaded into the automated guided vehicle; and a traveling unit that performs automated traveling in accordance with the received movement instruction. The management device includes: a movement instruction management unit that transmits the movement instruction to each of the automated guided vehicles; a load information receiving unit that receives the load information from each of the automated guided vehicles; and a load amount management unit that manages a load amount of each of the automated guided vehicles on the basis of the load information. In a case where a load amount of a first automated guided vehicle exceeds a predetermined criterion value while a loading operation is ongoing for the first automated guided vehicle at the loading operation place, the movement instruction management unit transmits, to a second automated guided vehicle different from the first automated guided vehicle, a movement instruction for moving to the loading operation place or the specified position near the loading operation place.

In the present invention, on the basis of the fact that the load amount of an automated guided vehicle exceeds the criterion value, the management device gives a movement instruction for moving the next automated guided vehicle to the position of the automated guided vehicle, and manages cargos placed at the loading operation place. The specific form of the management device is, for example, a server that manages the flow of cargos and manages traveling of automated guided vehicles. Note that a server that manages the flow of cargos and a server that manages traveling of automated guided vehicles may be integrated or may be separately provided.

Automated traveling is traveling in which at least some of a start of traveling, a stop of traveling, and route selection are performed without an instruction from a person (driver). An automated guided vehicle travels in an automated manner and transports loaded cargos.

Further, the movement instruction management unit sends a movement instruction to each of the automated guided vehicles to manage traveling of the automated guided vehicles. In the above-described embodiments, the CPU of the AGV server performs processing in accordance with the AGV running control program to thereby implement the functions of the movement instruction management unit.

A movement instruction is an instruction for moving to at least one loading operation place or a specified position near the loading operation place. Here, the nearby specified position is, for example, a position as described below. Here, it is assumed that the first automated guided vehicle stops at a loading operation place and is loaded with cargos and almost fully loaded, and the load amount exceeds the criterion value. When load information is transmitted to the management device, the movement instruction management unit sends a movement instruction to the second automated guided vehicle in an empty state and causes the second automated guided vehicle to move to the operation place where the first automated guided vehicle is kept stopped. When the second automated guided vehicle that has received the movement instruction arrives at the specified position, that is, the operation place where loading to the first automated guided vehicle has been performed, in a case where the first automated guided vehicle has already been fully loaded and has moved toward an unloading place from the loading operation place, the second automated guided vehicle can stop at the loading operation place that becomes unoccupied. However, in a case where the first automated guided vehicle is not yet fully loaded and remains stopped at the loading operation place, the second automated guided vehicle needs to wait at a position on the near side of the loading operation place. This position is the nearby specified position. For example, a position a predetermined distance away from the loading operation place is the specified position.

The driving mechanism of the automated guided vehicle in the above-described embodiments corresponds to the traveling unit.

The load information receiving unit processes load information received from the AGV or the operator console via the communication interface 37. The CPU of the AGV server performs processing in accordance with the AGV running control program to thereby implement the functions of the load information receiving unit.

Further, preferred forms of the present invention will be described.

(ii) The load information may include at least either a volume or a weight of the cargo loaded into the automated guided vehicle.

Accordingly, the load amount can be grasped on the basis of the volume of the cargo, the weight of the cargo, or both the volume and weight of the cargo, and moving of the next vehicle can be started before the load amount reaches the maximum load amount.

(iii) The load information may include a type and a quantity of the cargo loaded into the automated guided vehicle; the management device may further include a cargo information storage unit that stores at least either a volume or a weight per cargo for each type as cargo information; and the load amount management unit may manage the load amount of each of the automated guided vehicles on the basis of the load information and the cargo information.

Accordingly, the load amount management unit can grasp the amount of the cargo loaded into the automated guided vehicle at the loading operation place on the basis of the load information and the cargo information.

Note that the cargo information storage unit corresponds to a storage device, of the cargo management server, that stores cargo information in the above-described embodiments.

Note that the load information may include the quantity of the cargo and information for associating the cargo with the cargo information. Accordingly, on the basis of the quantity of the loaded cargo included in the load information and at least either the volume or the weight per cargo included in the cargo information, the management device can grasp the load amount of the automated guided vehicle. In this case, the load information is information sent from, for example, the operator console and corresponds to information about the type and quantity of the cargo loaded into the AGV by picking.

(iv) The movement instruction management unit may change the criterion value in accordance with a distance between a position of the loading operation place where the loading operation is ongoing and a position of an automated guided vehicle to which a transport instruction is transmitted in a case where the load amount exceeds the criterion value.

Accordingly, the movement instruction management unit can start moving of the next vehicle at a suitable timing based on the degree of distance between the position of the automated guided vehicle and the position of the next vehicle having a capacity for loading.

(v) The movement instruction management unit may change the criterion value in accordance with a degree of time previously taken for the automated guided vehicle for which the load amount exceeds the criterion value to load cargos.

Accordingly, the movement instruction management unit can start moving of the next vehicle at a suitable timing based on the degree of time previously taken for an operator, who loads cargos into the automated guided vehicle, to load cargos.

(vi) In a case where the movement instruction management unit transmits the movement instruction to the second automated guided vehicle, and thereafter, transmits a movement instruction to the first automated guided vehicle for moving to another loading operation place, the movement instruction management unit may change a movement destination of the second automated guided vehicle to the other loading operation place that is a movement destination of the first automated guided vehicle or a specified position near the other loading operation place.

Accordingly, even in a case where the first automated guided vehicle moves to another loading operation place after transmission of a movement instruction, the second automated guided vehicle moves to the other loading operation place to which the first automated guided vehicle moves or a specified position near the other loading operation place. Therefore, smooth and efficient replacement of the automated guided vehicle is made possible.

The preferred forms of the present invention include a combination of any of the plurality of forms described above.

(vii) An automated guided vehicle according to the present invention includes: a movement instruction receiving unit that receives a movement instruction for moving to at least one loading operation place where a loading operation of loading a cargo to be transported into the automated guided vehicle is performed or a specified position near the loading operation place; a traveling unit that performs automated traveling in accordance with the received movement instruction; and an information transmitting unit that transmits information for moving another automated guided vehicle to the loading operation place or the specified position near the loading operation place in a case where a load amount of the automated guided vehicle exceeds a predetermined criterion value while the loading operation at the loading operation place is ongoing.

With this form, determination based on the provided load information that the ratio of the amount of loaded cargo to an amount of cargo that can be loaded exceeds the predetermined criterion value can trigger the next vehicle to move to the position of the automated guided vehicle. Therefore, smooth and efficient replacement of the automated guided vehicle is made possible, and productivity of the operator and automated guided vehicles can be increased.

Note that, in a case where the load amount of the automated guided vehicle exceeds the predetermined criterion value during a loading operation at the loading operation place, another automated guided vehicle is caused to move to the loading operation place or a specified position near the loading operation place on the basis of, for example, the following information. In a case where the automated guided vehicle includes a weight sensor and a volume sensor as illustrated in FIG. 2, the information is information concerning the load amount based on detection by these sensors.

The functions of the information transmitting unit are implemented as a process for transmitting information concerning the load amount to the management device, among the processes that are performed by the control unit.

Further, the management device concerning the cargo transport system according to the present invention need not be installed at a specific place, and a form may be employed in which the management device is mounted in the automated guided vehicle so as to be movable. In this case, the automated guided vehicle and the management device are functionally separated but are physically integrated, and it can be considered that the cargo transport system is constituted by a plurality of automated guided vehicles.

Further, one form of the cargo transport system according to the present invention is as follows.

(viii) A cargo transport system according to one form is a cargo transport system including: a management device; a plurality of automated guided vehicles; and a console. Each of the automated guided vehicles includes: a movement instruction receiving unit that receives, from the management device, a movement instruction for moving to at least one loading operation place where a loading operation of loading a cargo to be transported into the automated guided vehicle is performed or a specified position near the loading operation place; and a traveling unit that performs automated traveling in accordance with the received movement instruction. The console includes a load information transmitting unit that transmits, to the management device, load information concerning a load state of the cargo loaded into the automated guided vehicle. The management device includes: a movement instruction management unit that transmits the movement instruction to each of the automated guided vehicles; a load information receiving unit that receives the load information from each of the automated guided vehicles; and a load amount management unit that manages a load amount of each of the automated guided vehicles on the basis of the load information. In a case where a load amount of a first automated guided vehicle exceeds a predetermined criterion value while a loading operation is ongoing for the first automated guided vehicle at the loading operation place, the movement instruction management unit transmits, to a second automated guided vehicle different from the first automated guided vehicle, a movement instruction for moving to the loading operation place or the specified position near the loading operation place.

Here, the load information transmitted from the console includes, for example, the type and quantity of the cargo loaded into the automated guided vehicle. The management device retains, for example, at least either the volume or the weight per cargo for each type as cargo information so as to correspond to the load information. Accordingly, on the basis of the load information and the cargo information, the amount of the cargo loaded into the automated guided vehicle at the loading operation place can be grasped. Moving of the next vehicle can be started before the load amount of the automated guided vehicle reaches the maximum load amount.

The preferred forms of the present invention include a combination of any of the plurality of forms described above.

In addition to the embodiments described above, various modifications can be made to the present invention. These modifications should be construed as falling within the scope of the present invention. The present invention should include any modifications within the meaning and the scope equivalent to the terms of the claims.

REFERENCE SIGNS LIST

1: line, 2: AGV main body
11: cargo transport system
20: driving mechanism, 21: line sensor, 23: control unit, 24: storage unit, 25: battery
31: management device, 33: cargo management server, 35: AGV server, 35c: AGV running control program, 35d: AGV database, 37: communication interface
40: operator, 41, 41-1, 41-2, 41-3: AGV, 42: cargo, 43: container part, 43a: weight sensor, 43b: volume sensor, 44: stand, 45: operator console, 46: on-vehicle communication unit, 47: start button
51: AGV client, 51c: AGV course editor, 51m: AGV monitor
61: travel course, 63: waiting place, 65: unloading place
201A: left driving wheel, 201B: right driving wheel, 202: guide wheel, 203A: left motor, 203B: right motor, 231: motion control unit, 232: position determination unit, 235: detection control unit, 237: movement instruction receiving unit, 239: information transmitting unit

The invention claimed is:

1. A cargo transport system comprising: a management device; and a plurality of automated guided vehicles,
   each of the automated guided vehicles including:
   at least one first processor; and
   at least one first memory coupled to the at least one first processor and storing first computer-executable instructions that, when executed by the at least one first processor, cause the automated guided vehicle to:
   receive, from the management device, a movement instruction for moving to at least one loading operation place where a loading operation of loading a cargo to be transported into the automated guided vehicle is performed or a specified position near the loading operation place,
   transmit, to the management device, load information concerning a load state of the cargo loaded into the automated guided vehicle, and
   perform automated traveling in accordance with the received movement instruction, the management device including:
   at least one second processor; and
   at least one second memory coupled to the at least one second processor and storing second computer-executable instructions that, when executed by the at least one second processor, cause the management device to:
   transmit the movement instruction to each of the automated guided vehicles,
   receive the load information from each of the automated guided vehicles, and
   manage a load amount of each of the automated guided vehicles on a basis of the load information, wherein
   when a load amount of a first automated guided vehicle exceeds a predetermined criterion value that is less than a maximum load capacity of the first automated guided vehicle while a loading operation is ongoing for the first automated guided vehicle at the loading operation place, transmit a movement instruction to a second automated guided vehicle different from the first automated guided vehicle, for moving to the loading operation place or the specified position near the loading operation place,
   when the load amount of the first automated guided vehicle reaches the maximum load capacity, the loading operation ongoing at the loading operation place or the specified position near the loading operation place is switched from the first automated guided vehicle to the second automated guided vehicle, the load information includes at least either a volume or a weight of the cargo loaded into the automated guided vehicle, and the predetermined criterion value is changed to an updated criterion value in accordance with a distance between a position of the loading operation place where the loading operation is ongoing and a position of the second automated guided vehicle to which a transport, instruction is transmitted when the load amount of the first automated guided vehicle exceeds the predetermined criterion value.

2. The cargo transport system according to claim 1, wherein the load information includes a type and a quantity of the cargo loaded into each of the automated guided vehicles, the management device further:

stores at least either a volume or a weight per cargo for each type as cargo information, and manages the load amount of each of the automated guided vehicles on the basis of the load information and the cargo information.

3. The cargo transport system according to claim 1, wherein the predetermined criterion value is changed in accordance with a degree of time previously taken for the first automated guided vehicle for which the load amount exceeds the predetermined criterion value to load cargos.

4. The cargo transport system according to claim 1, wherein in a case where the movement instruction is transmitted to the second automated guided vehicle, and thereafter, the management device transmits a new movement instruction to the first automated guided vehicle for moving to another loading operation place, a movement destination of the second automated guided vehicle is changed to the other loading operation place that is a movement destination of the first automated guided vehicle or a specified position near the other loading operation place.

5. An automated guided vehicle comprising:

at least one processor; and at least one memory coupled to the at least one processor and storing computer-executable instructions that, when executed by the at least one processor, cause the automated guided vehicle to:

receive a movement instruction for moving to at least one loading operation place where a loading operation of loading a cargo to be transported into the automated guided vehicle is performed or a specified position near the loading operation place;

perform automated traveling in accordance with the received movement instruction; and transmit information for moving another automated guided vehicle to the loading operation place or the specified position near the loading operation place when a load amount of the automated guided vehicle exceeds a predetermined criterion value that is less than a maximum load capacity of the automated guided vehicle while the loading operation at the loading operation place is ongoing, wherein when the load amount of the automated guided vehicle reaches the maximum load capacity, the loading operation ongoing at the loading operation place or the specified position near the loading operation place is switched from the automated guided vehicle to the other automated guided vehicle, load information includes at least either a volume or a weight of the cargo loaded into the automated guided vehicle, and the predetermined criterion value is changed to an updated criterion value in accordance with a distance between a position of the loading operation place where the loading operation is ongoing and a position of the other automated guided vehicle to which a transport instruction is transmitted when the load amount of the automated guided vehicle exceeds the predetermined criterion value.

6. A cargo transport system comprising: a management device; a plurality of automated guided vehicles; and a console, each of the automated guided vehicles including:

at least one first processor; and at least one first memory coupled to the at least one first processor and storing first computer-executable instructions that, when executed by the at least one first processor, cause the automated guided vehicle to:

receive from the management device, a movement instruction for moving to at least one loading operation place where a loading operation of loading a cargo to be transported into the automated guided vehicle is performed or a specified position near the loading operation place, and perform automated traveling in accordance with the received movement instruction, the console including:

at least one second processor; and at least one second memory coupled to the at least one second processor and storing second computer-executable instructions that, when executed by the at least one second processor, cause the console to:

transmit to the management device, load information concerning a load state of the cargo loaded into the automated guided vehicle, the management device including:

at least one third processor; and at least one third memory coupled to the at least one third processor and storing third computer-executable instructions that, when executed by the at least one third processor, cause the management device to:

transmit the movement instruction to each of the automated guided vehicles, receive the load information from each of the automated guided vehicles, and manage a load amount of each of the automated guided vehicles on a basis of the load information, wherein when a load amount of a first automated guided vehicle exceeds a predetermined criterion value that is less than a maximum load capacity of the first automated guided vehicle while a loading operation is ongoing for the first automated guided vehicle at the loading operation place, a movement instruction is transmitted to a second automated guided vehicle different from the first automated guided vehicle, for moving to the loading operation place or the specified position near the loading operation place, when the load amount of the first automated guided vehicle reaches the maximum load capacity, the loading operation ongoing at the loading operation place or the specified position near the loading operation place is switched from the first automated guided vehicle to the second automated guided vehicle, wherein load information includes at least either a volume or a weight of the cargo loaded into the automated guided vehicle, and the predetermined criterion value is changed to an updated criterion value in accordance with a distance between a position of the loading operation place where the loading operation is ongoing and a position of the second automated guided vehicle to which a transport instruction is transmitted when the load amount of the first automated guided vehicle exceeds the predetermined criterion value.

\* \* \* \* \*